July 28, 1931. A. M. ALGEO ET AL 1,816,275
CONTROL MECHANISM FOR GLASS FEEDERS
Filed Feb. 13, 1926 2 Sheets-Sheet 2
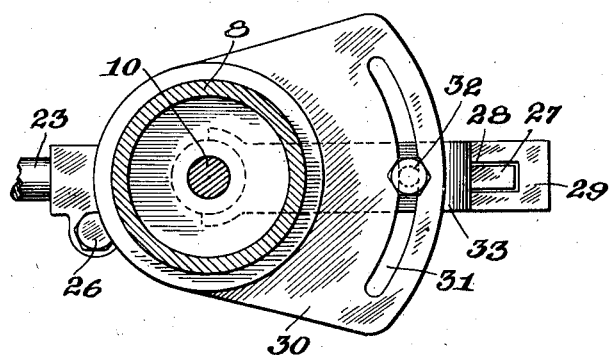
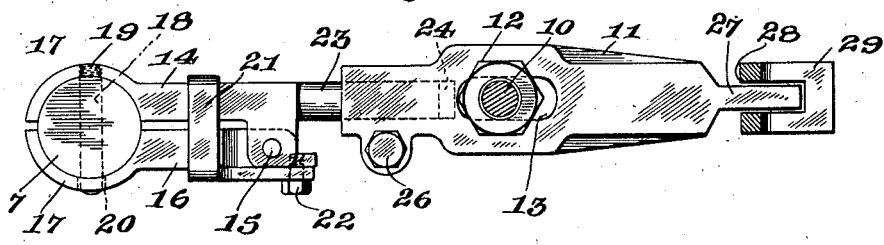
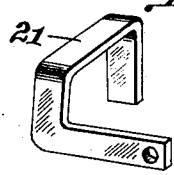
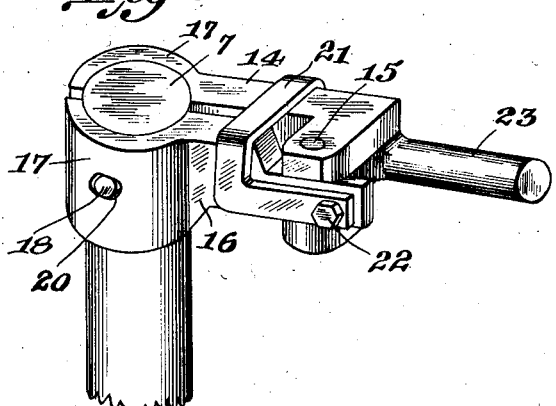
Inventors
Albert M. Algeo
AND James W. Ross
By Eccleston & Eccleston
Attorneys Patented July 28, 1931

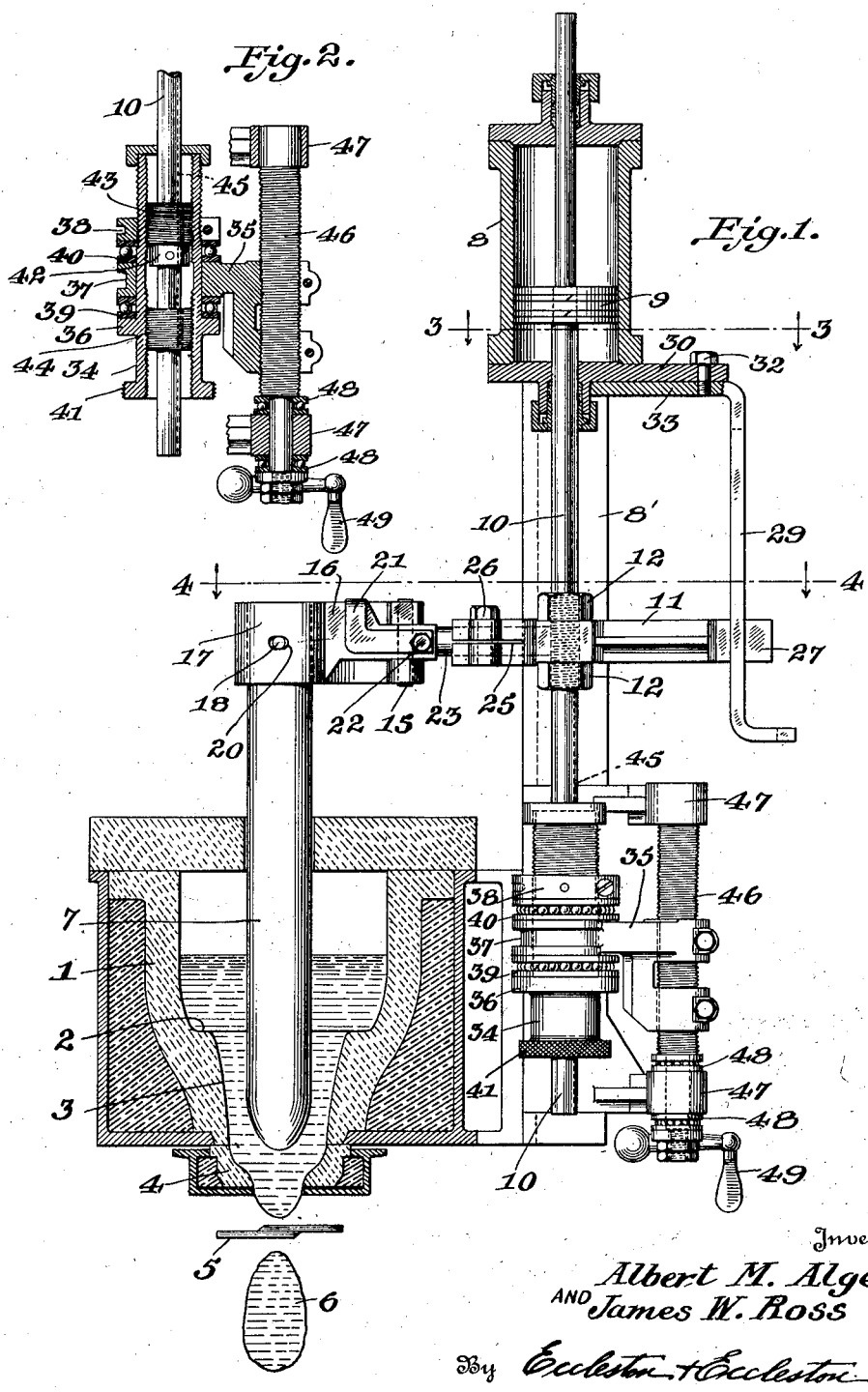

1,816,275

UNITED STATES PATENT OFFICE

ALBERT M. ALGEO AND JAMES W. ROSS, OF WASHINGTON, PENNSYLVANIA, ASSIGNORS TO HAZEL-ATLAS GLASS CO., OF WHEELING, WEST VIRGINIA, A CORPORATION OF WEST VIRGINIA

CONTROL MECHANISM FOR GLASS FEEDERS

Application filed February 13, 1926. Serial No. 88,066.

The invention relates generally to glass feeders of the well known reciprocating plunger type, and in particular it relates to certain novel adjustments thereof, the construction and advantages of which will be understood from the following detailed description, taken in connection with the accompanying drawings; in which Figure 1 is an elevational view of the complete apparatus; the flow spout and the feeder operating cylinder being shown in section.

Figure 2 is a vertical sectional view of the vertical adjusting mechanism.

Figure 3 is an enlarged detail horizontal sectional view taken on line 3—3 of Figure 1.

Figure 4 is a horizontal sectional view taken on line 4—4 of Figure 1.

Figure 5 is a detail perspective view of the mounting for the feed control plunger; and Figure 6 is a detail perspective view of the dog for locking the plunger in its mounting.

Referring to the drawings more in detail, numeral 1 indicates the conventional form of flow spout, the floor of which is referred to by numeral 2. The flow spout is provided with the usual well 3, and arranged at the bottom of the well is the usual removable variable size bushing 4, the well and bushing constituting the flow orifice; and arranged below the bushing are the usual shears 5 for severing the gob 6.

The well known reciprocating plug or plunger, indicated by numeral 7, is mounted in the flow spout in vertical alignment with the flow orifice, and with its lower end within the well or flow orifice 3 and 4. It is unnecessary to describe in detail herein the manner in which the gobs are formed by the plug 7, for it is well known in the glass art that the plug alternately accelerates and retards the gravity flow of glass through the well 3 and 4; thereby forming the suspended gobs, which are then severed, and drop into molds.

The purpose of the present invention is to provide new and improved means for controlling the operation of the reciprocable plug 7, and such means will now be described.

Numeral 8 refers to the operating cylinder for the reciprocable feeder plug, and this cylinder is, of course, provided with the necessary inlet and exhaust ports and valves (not shown) for controlling the admission and exhaust of compressed air or other motive fluid for causing the reciprocation of the piston 9 and its piston rod 10. The cylinder 8 is shown as mounted on a bracket 8' which, as shown in the drawings, may be carried by the flow spout frame.

The piston rod 10 has mounted thereon, at a suitable point, a cross arm which is referred to generally by numeral 11, and which is shown in detail in Figures 1, 4 and 5.

The cross arm 11 is provided with an opening 13 through which passes the piston rod 10, and the cross arm is locked to the piston rod by means of nuts 12, 12. By reference to Figure 4, it will be observed that the opening 13 is elongated or slotted. It is evident that by means of this elongated opening the cross arm may be moved forwardly or backward in a horizontal plane, to bring the plug 7 carried thereby, in proper alignment with the flow orifice. It will be understood that the adjustment just described is provided so that the feeder is suited to various installations; and the finer adjustments for accurately maintaining the plug aligned with the flow orifice, for overcoming deformations in the plug, etc., will be described below.

The specific means illustrated herein for holding the feeder plug 7, consists of a rigid arm 14 to which is pivotally attached at 15 the swinging arm 16; the two arms being provided at their free ends with fingers 17 which are adapted to embrace the upper end of the plug 7, as clearly illustrated in the drawings.

The upper end of the plug 7 is pierced by a transverse passage extending entirely through the plug, and this passage is adapted to receive a pin 18; one end of the pin being screwed into the fixed finger 17, as indicated by numeral 19, and the other end of the pin is loosely received in an opening 20 in the movable finger 17, the opening 20 being somewhat larger than the pin; so that the arm 16 may be moved back and forth upon its pivot to open and closed position. The arm 16 is locked in closed position by means of a dog 21 which is pivotally mounted at 22 on the swinging arm 16. The sides of the dog 21 converge upwardly very slightly, as clearly illustrated in Figure 6, so that when the dog is forced down the fingers 17 will be drawn together to tightly grip the feeder plug 7.

When it is desired to remove a plug it is only necessary to lift the dog 21, swing the arm 16 outwardly, and remove the plug from the pin 18. A new plug is then mounted on the pin 18, the arm 16 is moved to closed position, and the parts are wedged into plug gripping position by lowering the dog 21.

It will be understood that the specific mechanism for securing the plug is to be considered in an illustrative rather than a limiting sense, for the invention contemplates the use of any suitable means for securing the plug.

A rounded rod 23 is formed integral with and extends from the arm 14, and this rod 23 is fitted into a socket 24 provided in the end of the cross arm 11. The end of the cross arm adjacent the socket is split, as indicated by numeral 25 in Figure 1, and a screw 26 is provided for clamping the socket about the rod 23, for securely maintaining the latter in adjusted position. The construction just described provides two adjustments for the feed plug 7, as indicated below.

It is apparent that by loosening the screw 26 the rod 23 carrying the feeder plug 7, may be adjusted longitudinally in the socket 24, thereby accurately positioning the plug in vertical alignment with the flow orifice; and by setting up on the screw 26 the plug will be maintained in its aligned position.

It will also be apparent that by loosening the screw 26, the rod 23 carrying the feeder plug 7, may be rotated through any desired arc to take care of any deformities in the plug, or for otherwise properly aligning it with the flow orifice. After the rod has been turned through the desired arc it will be maintained in its adjusted position by setting up on the screw 26.

The cross arm 11 carries at its opposite end a finger 27 which, during the reciprocation of the feeder plug 7, travels up and down in a slot 28 provided in the guide member 29; thus maintaining the plug 7 properly aligned with the flow orifice. The cross arm 11 may be turned with the piston rod 10, as a further means for accurately adjusting the feeder plug in alignment with the flow orifice; and for guiding the feeder plug in this adjusted position we have provided means for adjusting the guide member 29. Referring particularly to Figure 3, it will be noted that the lateral extension 30 of the base of cylinder 8, is provided with an arcuate slot 31, and that a screw 32 passes through this slot and screw-threadedly engages the horizontal portion 33 of the guide member 29. To accomplish this adjustment it is only necessary to loosen screw 32 and turn to the desired extent the guide member, the cross arm, the piston rod, and the feeder plug, as a single unit, and then set up on the screw 32.

In the foregoing description we have set forth the manner in which the feeder may be suited to various installations by reason of the adjustment permitted by the elongated opening 13; and we have also set forth the finer adjustments by which the feeder plug may always be accurately aligned with the flow orifice; namely, the longitudinal adjustment of the rod 23 in the socket 24, the turning adjustment of the rod 23 in the socket 24, and the turning adjustment of the cross arm 11. We shall now describe the novel means for readily and sensitively adjusting the length and the limits of the plunger stroke.

Referring now to Figures 1 and 2, numeral 34 indicates a rotatable controller member which is mounted in a bracket 35. An annular shoulder 36 is provided on the controller member below the laterally extending arm 37 of the bracket 35, and a collar 38 is mounted on the controller above the laterally extending arm 37. Arranged between the shoulder 36 and the arm 37, is a ball bearing race 39; and arranged between the collar 38 and the arm 37 is another ball bearing race 40. In this manner the controller member 34 is not permitted to move longitudinally with respect to the bracket, but it is permitted to be rotated therein. To provide means for rotating the controller member, the lower end thereof is preferably knurled, as indicated by numeral 41.

The piston rod 10 extends downwardly through the controller member, and has pinned thereto, within the controller member, a collar 42. This collar is arranged between two nuts, 43 and 44, which are screw-threadedly mounted in the controller member and through which the piston rod 10 freely passes. The nuts 43 and 44 are oppositely threaded, and preferably the upper nut 43 has left-handed threads and the lower nut right-handed threads. The nuts are held against rotation by means of keys (not shown) carried by the nuts, and which fit into the keyway 45 provided in the piston rod 10.

As the piston rod 10 is reciprocated by the cylinder 8, its travel, as well as the travel of the feeder plug 7, is limited by the engagement of the collar 42 with the nuts 43 and 44. Now it is apparent that if the controller member is rotated, the nuts 43 and 44 will be moved simultaneously in opposite directions, either toward each other, or away from each other, depending on the direction of rotation of the controller member. If the controller member be turned in one direction the nut 43 will be elevated to an extent depending upon the extent of rotation of the controller member, and the nut 44 will be simultaneously lowered to exactly the same extent that the upper is elevated. Thus the length of travel of the feeder plug 7 is increased, by simultaneously raising its upper limit and lowering its lower limit to the same extent. On the other hand, by turning the controller member in the opposite direction, the nut 43 will be lowered to an extent depending upon the extent of rotation of the controller member, and the nut 44 will be simultaneously raised to exactly the same extent that the upper nut is lowered. Thus the length of travel of the feeder plug is reduced, by simultaneously lowering the upper limit and raising the lower limit to the same extent.

By the adjusting means just described the length of travel of the feeder plug is varied by simultaneously varying in opposite directions and to the same extent its limits of travel. But it is also desirable in some instances, to retain unchanged the length of travel of the feeder plug, and at the same time change the elevation at which the feeder plug reciprocates. We have devised an extremely simple means for effecting this adjustment; such means being described below.

As stated hereinbefore, the controller member 34 has no movement of translation with respect to the bracket 35. Accordingly, for effecting a vertical movement of the controller, we mount the bracket on a screw-threaded shaft 46. The shaft 46 is mounted for rotation, but against longitudinal movement, in journals 47, 47, preferably carried by the bracket 8', and ball-bearing races 48, 48, are provided above and below the lower journal. The shaft 46 is rotated by means of an operating handle 49 attached to the shaft in any desired manner.

If the shaft 46 is rotated in one direction it will elevate the bracket 35, and thus the controller member and nuts 43 and 44 will be lifted bodily to an extent depending on the extent of rotation of the shaft 46. It is thus apparent that the extent of travel of the feeder plug remains the same, but the elevation at which the plug reciprocates, has been raised.

If the shaft 46 is rotated in the opposite direction the bracket 35 will be lowered, and the controller member and nuts 43 and 44 will be bodily lowered. Thus the extent of travel of the feeder plug remains the same, but the elevation at which the plug reciprocates, has been lowered.

It will be noted that by the rotation of the controller member the nuts 43, 44, are simultaneously moved the same distance in opposite directions, either toward or from each other, thereby changing the length of stroke of the feeder plug; while by the rotation of the screw shaft 46 the nuts 43, 44, are simultaneously moved the same distance in the same direction, either up or down, thereby maintaining the length of stroke the same, but altering the vertical position of the path of the stroke. It is thus seen that the nuts 43, 44, may be moved simultaneously toward each other, or simultaneously away from each other, or they may be moved simultaneously in the same direction, either upwardly or downwardly, but it is apparent that whatever the adjustment may be, the nuts must be adjusted simultaneously, as it is impossible in the operation of this mechanism to adjust either nut independently.

In accordance with the well known and common practice, the lower end of the plug when at the lower limit of its stroke is always within the well 3 and 4, and, as a matter of fact, the lower end of the plug is practically always within the well, even at the upper limit of its stroke.

Having fully described the invention, what we claim as new and desire to secure by Letters Patent is:

1. A glass feeder including a flow spout having a flow orifice, a feeder plug adapted to reciprocate in the flow spout in alignment with the flow orifice, a reciprocable member for reciprocating the plug, a rotatable controller member receiving one end of the reciprocable member, oppositely threaded nuts mounted in said controller member for limiting the extent of movement of said reciprocable member, said nuts being simultaneously moved toward each other by rotation of the controller member.

2. A glass feeder including a flow spout having a flow orifice, a feeder plug adapted to reciprocate in the flow spout in alignment with the flow orifice, a reciprocable member for reciprocating the plug, a rotatable controller member receiving one end of the reciprocable member, oppositely threaded nuts mounted in said controller member for limiting the extent of movement of said reciprocable member, said nuts being simultaneously moved away from each other by rotation of the controller member.

3. A glass feeder including a flow spout having a flow orifice, a feeder plug adapted to reciprocate in the flow spout in alignment with the flow orifice, a reciprocable member for reciprocating the plug, a rotatable controller member receiving one end of the reciprocable member, oppositely threaded nuts mounted in said controller member for limiting the extent of movement of said reciprocable member, said nuts being simultaneously movable toward or from each other in accordance with the direction of rotation of the controller member.

4. A glass feeder, including a reciprocable feeder plug, a cylinder and piston rod for reciprocating said plug, a rotatable controller member receiving one end of said piston rod, oppositely threaded nuts mounted in the controller member for limiting the extent of movement of the piston rod, said nuts being simultaneously movable in opposite directions by rotation of the controller member.

5. A glass feeder, including a reciprocable feeder plug, a cylinder and piston rod for reciprocating said plug, a controller receiving one end of the piston rod, means carried by the controller for limiting the extent of movement of the piston rod, and means for raising and lowering said controller.

6. A glass feeder, including a reciprocable feeder plug, a cylinder and piston rod for reciprocating said plug, a controller member receiving one end of the piston rod, oppositely threaded nuts mounted in said controller for limiting the extent of movement of the piston rod, said nuts being simultaneously moved in opposite directions by rotation of the controller member, and said nuts being simultaneously moved in the same direction by raising or lowering the said controller member.

7. A glass feeder, including a reciprocable feeder plug, a cylinder and piston rod for reciprocating said plug, a controller member receiving one end of the piston rod, oppositely threaded nuts mounted in said controller for limiting the extent of movement of the piston rod, said nuts being simultaneously movable in opposite directions or simultaneously movable in the same direction.

8. A glass feeder, including a reciprocable feeder plug, a cylinder and piston rod for reciprocating said plug, a controller member receiving one end of the piston rod, oppositely threaded nuts mounted in said controller for limiting the extent of movement of the piston rod, said controller being rotatably mounted in a bracket, and means for raising and lowering said bracket.

9. A glass feeder including a reciprocable feeder plug, a cylinder and piston rod for reciprocating said plug, a controller member receiving one end of the piston rod, oppositely threaded nuts mounted in said controller for limiting the extent of movement of the piston rod, said controller being rotatable for simultaneously moving said nuts in opposite directions for varying the length of stroke of said piston rod, a bracket in which the controller is mounted, and means for raising and lowering the bracket.

10. A glass feeder, including a reciprocable feeder plug, a cylinder and piston rod for reciprocating said plug, a controller member receiving one end of the piston rod, oppositely threaded nuts mounted in said controller for limiting the extent of movement of the piston rod, said controller being rotatable for simultaneously moving the nuts in opposite directions, and said controller being longitudinally movable for simultaneously moving the nuts in the same direction.

11. A glass feeder, including a flow spout having a flow orifice, a feeder plug adapted to reciprocate in the flow spout in alignment with the flow orifice, a reciprocable rod for reciprocating said plug, and a cross arm carrying said plug and mounted on said rod, said cross arm being longitudinally adjustable on and arcuately adjustable about said rod.

12. A glass feeder, including a flow spout having a flow orifice, a feeder plug adapted to reciprocate in the flow spout in alignment with the flow orifice, a reciprocable rod for reciprocating said plug, a cross arm mounted on said rod and carrying said plug, and said cross arm having an elongated opening receiving the rod, for the purpose described.

13. A glass feeder, including a flow spout having a flow orifice, a feeder plug adapted to reciprocate in the flow spout in alignment with the flow orifice, a reciprocable member for reciprocating said feeder plug, a cross-arm mounted on said reciprocable member, means carrying the feeder plug, a horizontally extending rod connected with said means, said rod being rotatably and longitudinally adjustable.

14. A glass feeder, including a flow spout having a flow orifice, a feeder plug adapted to reciprocate in the flow spout in alignment with the flow orifice, a reciprocable member for reciprocating said feeder plug, a cross arm carrying said feeder plug and mounted on said reciprocable member, said cross arm having an arcuate adjustment about said reciprocable member said feeder plug being rotatably adjustable with respect to said cross arm as an axis.

15. A glass feeder, including a flow spout having a flow orifice, a feeder plug adapted to reciprocate in the flow spout in alignment with the flow orifice, a reciprocable member for reciprocating said feeder plug, a cross arm mounted on the reciprocable member, means carrying the feeder plug, said means being longitudinally and rotatably adjustable with respect to said cross arm, and said cross arm being arcuately adjustable about said reciprocable member.

16. A glass feeder, including a flow spout having a flow orifice, a feeder plug adapted to reciprocate in the flow spout in alignment with the flow orifice, a reciprocable member for reciprocating said feeder plug, a cross arm mounted on the reciprocable member, means carrying the feeder plug, said means being longitudinally adjustable with respect to said cross arm, and said cross arm being arcuately adjustable about said reciprocable member.

17. A glass feeder, including a flow spout having a flow orifice, a feeder plug adapted to reciprocate in the flow spout in alignment with the flow orifice, a reciprocable member for reciprocating said feeder plug, a cross arm mounted on the reciprocable member, means carrying the feeder plug, said means being rotatably adjustable with respect to said cross arm as an axis, and said cross arm being arcuately adjustable about said reciprocable member.

18. A glass feeder, including a flow spout having a flow orifice, a feeder plug adapted to reciprocate in the flow spout in alignment with the flow orifice, a reciprocable member for reciprocating said feeder plug, a cross arm mounted on the reciprocable member, means carrying the feeder plug, said means being longitudinally and rotatably adjustable with respect to said cross arm, said cross arm being longitudinally adjustable on and arcuately adjustable about said reciprocable member.

19. A glass feeder, including a flow spout having a flow orifice, a feeder plug adapted to reciprocate in the flow spout in alignment with the flow orifice, an arm carrying the feeder plug, means for adjusting the plug longitudinally of the arm, and means for rotatably adjusting the arm.

20. A glass feeder, including a flow spout having a flow orifice, means for controlling the feeding of glass through said orifice, a member carrying said means, said means being adjustable longitudinally of said member, and said member being rotatably adjustable.

ALBERT M. ALGEO.
JAMES W. ROSS.

DISCLAIMER 1,816,275.—*Albert M. Algeo* and *James W. Ross*, Washington, Pa. CONTROL MECHANISM FOR GLASS FEEDERS. Patent dated July 28, 1931. Disclaimer filed December 8, 1931, by the assignee, *Hazel-Atlas Glass Co.*

Hereby enters this disclaimer to claims 11 to 20, both inclusive, in said patent, which claims are in the following words, to wit:

"11. A glass feeder, including a flow spout having a flow orifice, a feeder plug adapted to reciprocate in the flow spout in alignment with the flow orifice, a reciprocable rod for reciprocating said plug, and a cross arm carrying said plug and mounted on said rod, said cross arm being longitudinally adjustable on and arcuately adjustable about said rod.

"12. A glass feeder, including a flow spout having a flow orifice, a feeder plug adapted to reciprocate in the flow spout in alignment with the flow orifice, a reciprocable rod for reciprocating said plug, a cross arm mounted on said rod and carrying said plug, and said cross arm having an elongated opening receiving the rod, for the purpose described.

"13. A glass feeder, including a flow spout having a flow orifice, a feeder plug adapted to reciprocate in the flow spout in alignment with the flow orifice, a reciprocable member for reciprocating said feeder plug, a cross-arm mounted on said reciprocable member, means carrying the feeder plug, a horizontally extending rod connected with said means, said rod being rotatably and longitudinally adjustable.

"14. A glass feeder, including a flow spout having a flow orifice, a feeder plug adapted to reciprocate in the flow spout in alignment with the flow orifice, a reciprocable member for reciprocating said feeder plug, a cross arm carrying said feeder plug and mounted on said reciprocable member, said cross arm having an arcuate adjustment about said reciprocable member said feeder plug being rotatably adjustable with respect to said cross arm as an axis.

"15. A glass feeder, including a flow spout having a flow orifice, a feeder plug adapted to reciprocate in the flow spout in alignment with the flow orifice, a reciprocable member for reciprocating said feeder plug, a cross arm mounted on the reciprocable member, means carrying the feeder plug, said means being longitudinally and rotatably adjustable with respect to said cross arm, and said cross arm being arcuately adjustable about said reciprocable member.

"16. A glass feeder, including a flow spout having a flow orifice, a feeder plug adapted to reciprocate in the flow spout in alignment with the flow orifice, a reciprocable member for reciprocating said feeder plug, a cross arm mounted on the reciprocable member, means carrying the feeder plug, said means being longitudinally adjustable with respect to said cross arm, and said cross arm being arcuately adjustable about said reciprocable member.

"17. A glass feeder, including a flow spout having a flow orifice, a feeder plug adapted to reciprocate in the flow spout in alignment with the flow orifice, a reciprocable member for reciprocating said feeder plug, a cross arm mounted on the reciprocable member, means carrying the feeder plug, said means being rotatably adjustable with respect to said cross arm as an axis, and said cross arm being arcuately adjustable about said reciprocable member.

"18. A glass feeder, including a flow spout having a flow orifice, a feeder plug adapted to reciprocate in the flow spout in alignment with the flow orifice, a reciprocable member for reciprocating said feeder plug, a cross arm mounted on the reciprocable member, means carrying the feeder plug, said means being longitudinally and rotatably adjustable with respect to said cross arm, said cross arm being longitudinally adjustable on and arcuately adjustable about said reciprocable member.

"19. A glass feeder, including a flow spout having a flow orifice, a feeder plug adapted to reciprocate in the flow spout in alignment with the flow orifice, an arm carrying the feeder plug, means for adjusting the plug longitudinally of the arm, and means for rotatably adjusting the arm.

"20. A glass feeder, including a flow spout having a flow orifice, means for controlling the feeding of glass through said orifice, a member carrying said means, said means being adjustable longitudinally of said member, and said member being rotatably adjustable."

[*Official Gazette December 29, 1931.*]